US008096259B1

(12) United States Patent
Nothum, Jr. et al.

(10) Patent No.: US 8,096,259 B1
(45) Date of Patent: Jan. 17, 2012

(54) GUTTERS AND PLOWS FOR COATING-MATERIAL RECIRCULATION IN FOOD-COATING APPARATUS

(76) Inventors: Robert G. Nothum, Jr., Willard, MO (US); Robert M. Nothum, Springfield, MO (US)

( * ) Notice: Subject to any disclaimer, the term of this patent is extended or adjusted under 35 U.S.C. 154(b) by 1060 days.

(21) Appl. No.: 11/705,551

(22) Filed: Feb. 12, 2007

Related U.S. Application Data

(63) Continuation-in-part of application No. 10/853,579, filed on May 24, 2004, now Pat. No. 7,231,885.

(60) Provisional application No. 60/488,777, filed on Jul. 21, 2003, provisional application No. 60/473,066, filed on May 23, 2003.

(51) Int. Cl.
*B05C 19/04* (2006.01)

(52) U.S. Cl. ............... 118/13; 118/19; 118/24; 118/308; 118/312; 118/600; 118/602

(58) Field of Classification Search .................... 118/13, 118/19, 24, 308, 312, 600, 602; 99/494; 198/525, 530, 635–637; 426/289, 295
See application file for complete search history.

(56) References Cited

U.S. PATENT DOCUMENTS

| | | | | |
|---|---|---|---|---|
| 3,528,361 A | 9/1970 | Le Van | ............... | 99/349 |
| 3,543,916 A * | 12/1970 | Berk | ............... | 198/367 |
| 3,689,280 A | 9/1972 | Werner | ............... | 426/249 |
| 3,759,218 A | 9/1973 | Korstvedt | ............... | 118/18 |
| 3,967,583 A | 7/1976 | Booth | ............... | 118/16 |
| 4,078,517 A | 3/1978 | Castellano et al. | ............... | 118/16 |
| 4,659,584 A | 4/1987 | Schilk | ............... | 604/294 |
| 5,937,744 A | 8/1999 | Nothum, Sr. et al. | ............... | 99/494 |
| 6,158,332 A | 12/2000 | Nothum, Sr. et al. | ............... | 99/494 |
| 6,305,274 B1 | 10/2001 | Nothum, Sr. et al. | ............... | 99/404 |
| 2001/0028911 A1 | 10/2001 | Weldy et al. | ............... | 426/574 |
| 2003/0079678 A1 | 5/2003 | Zeegers et al. | ............... | 118/16 |

FOREIGN PATENT DOCUMENTS

DE 3615177 A1 11/1987

OTHER PUBLICATIONS

English Translated Abstract DE 3615077 (A1).

* cited by examiner

*Primary Examiner* — Laura Edwards
(74) *Attorney, Agent, or Firm* — Jonathan A. Bay

(57) ABSTRACT

Apparatus for coating food products with breading material has an excess breading-material circulation/re-circulation system, which itself has a main, central product-intake conveyor scraping across an up-sloping bottom panel flanked by left and right elevators that course through up-sloping gutters astride the central conveyor's bottom panel. The central conveyor is relatively broad but shallow for only carrying a relatively light load that becomes a bottom bed of breading material for conveyance of food product thereon. In contrast, the elevators are relatively deep but thin in order to carry relatively-substantial streams of breading material, and disproportionate to their thin width, which are ultimately elevated to a topcoat-applicator and becomes a top-coating of breading material. One or more plows are arranged in the overhead space above the central conveyor to divert a main stream of excess breading material into one or more diverted streams aimed at the flanking elevators.

20 Claims, 10 Drawing Sheets

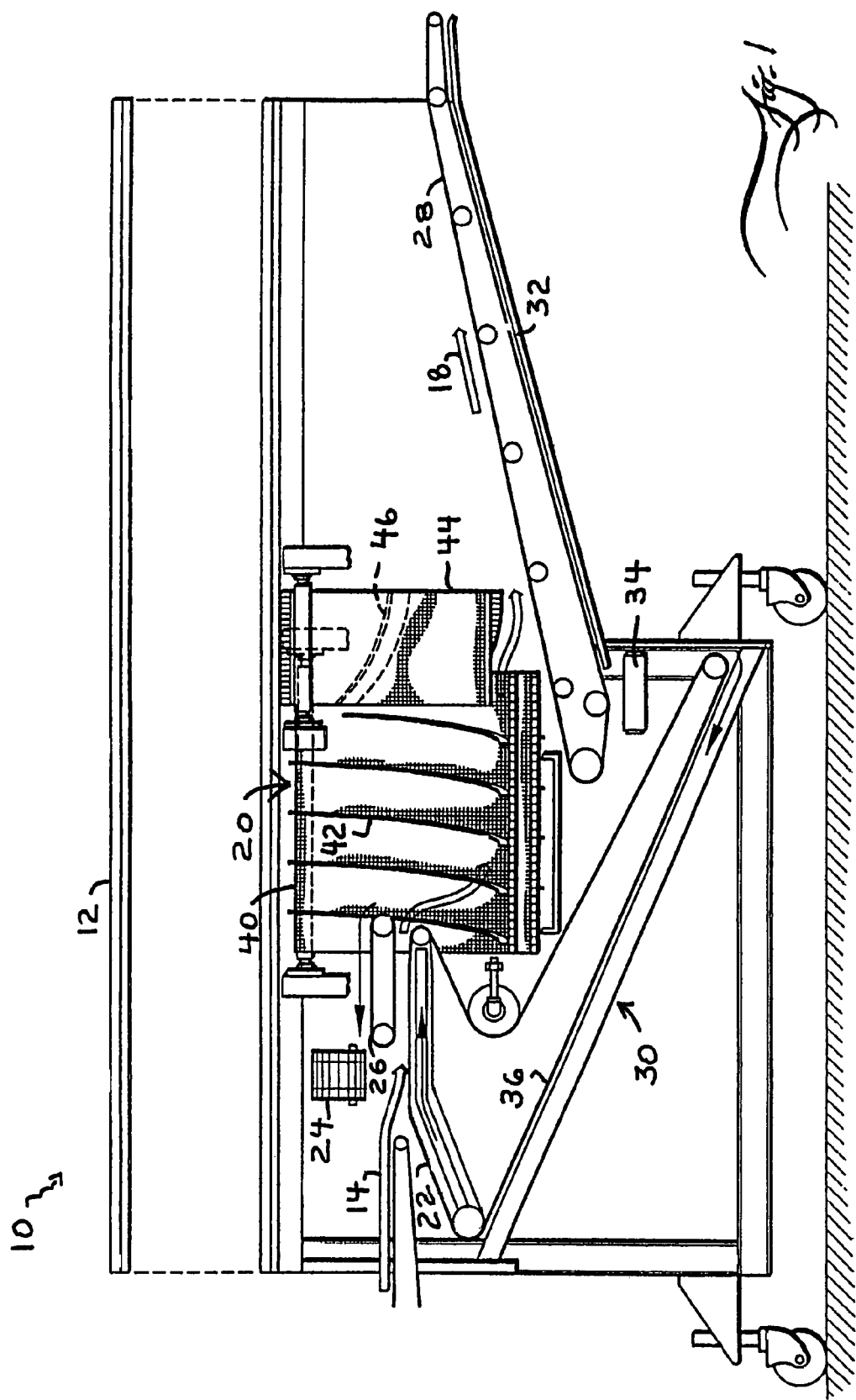

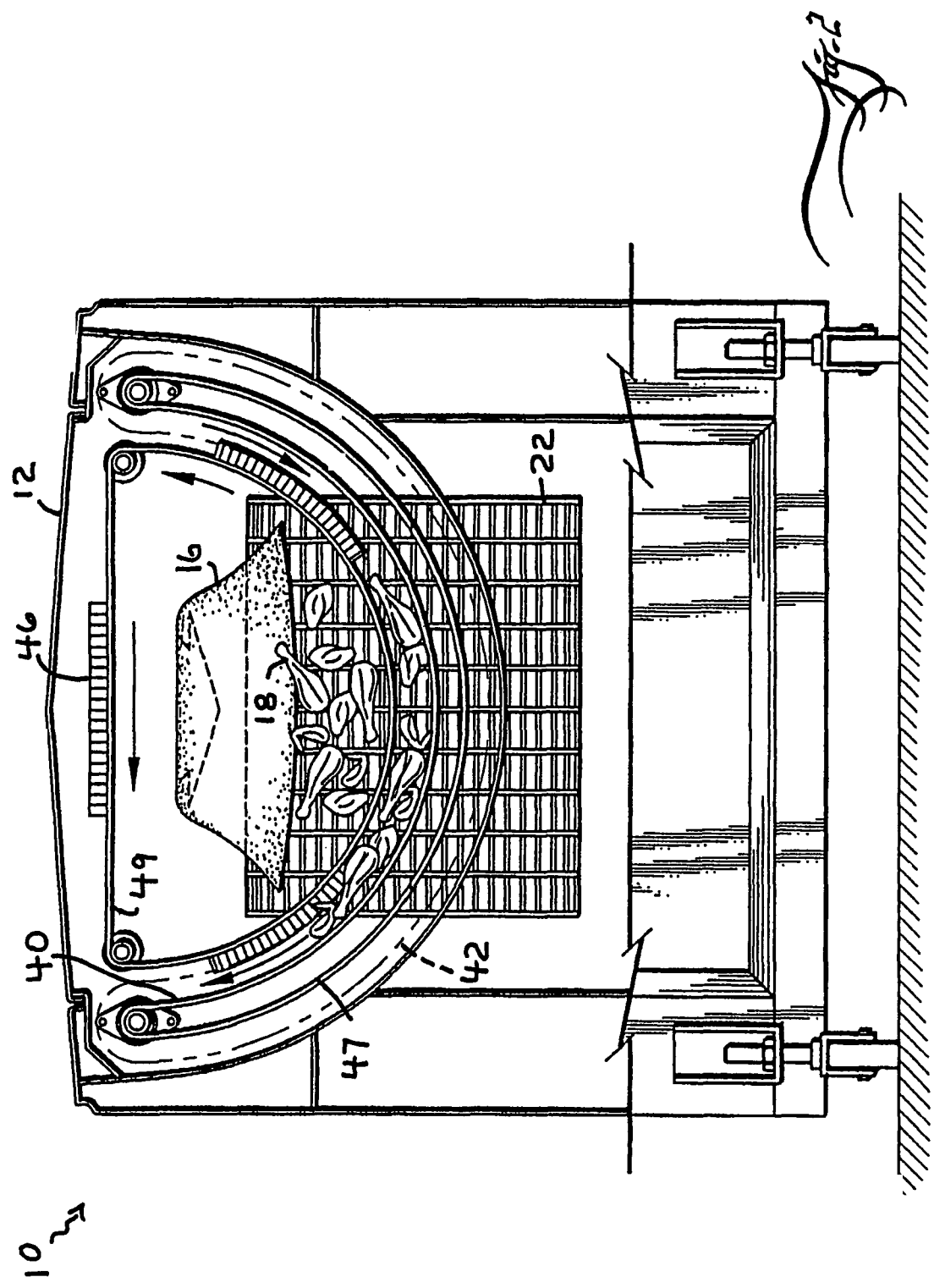

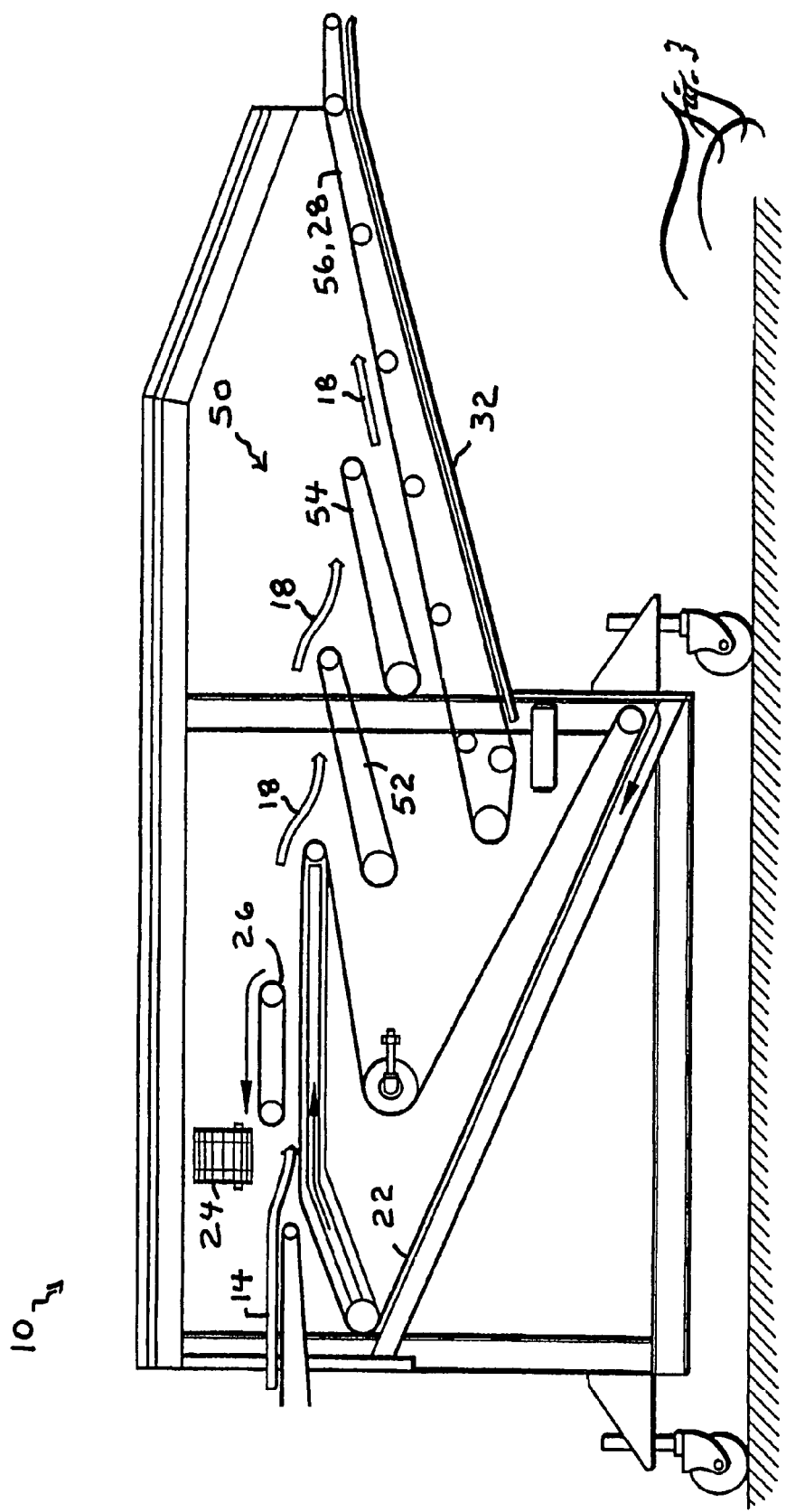

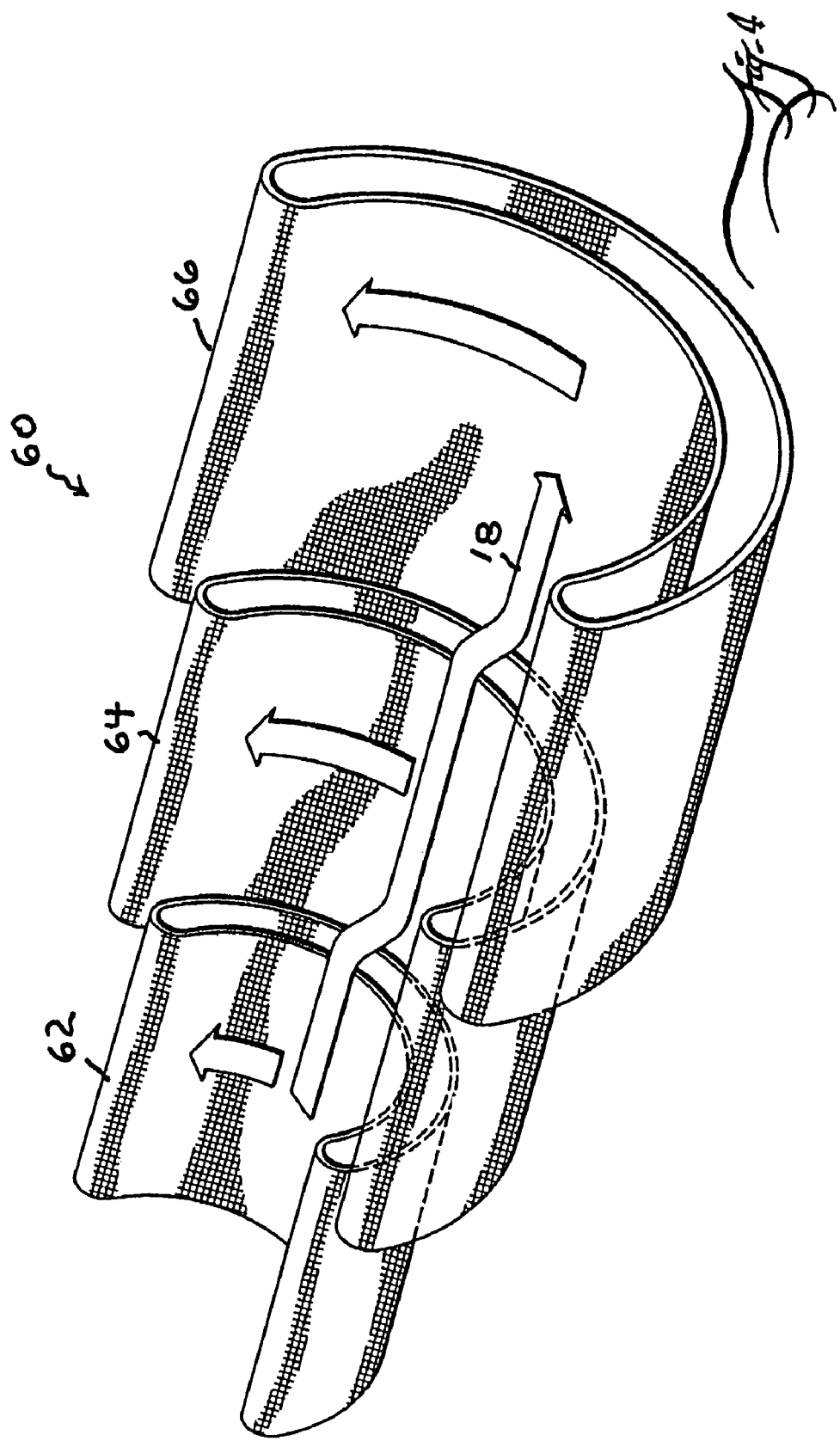

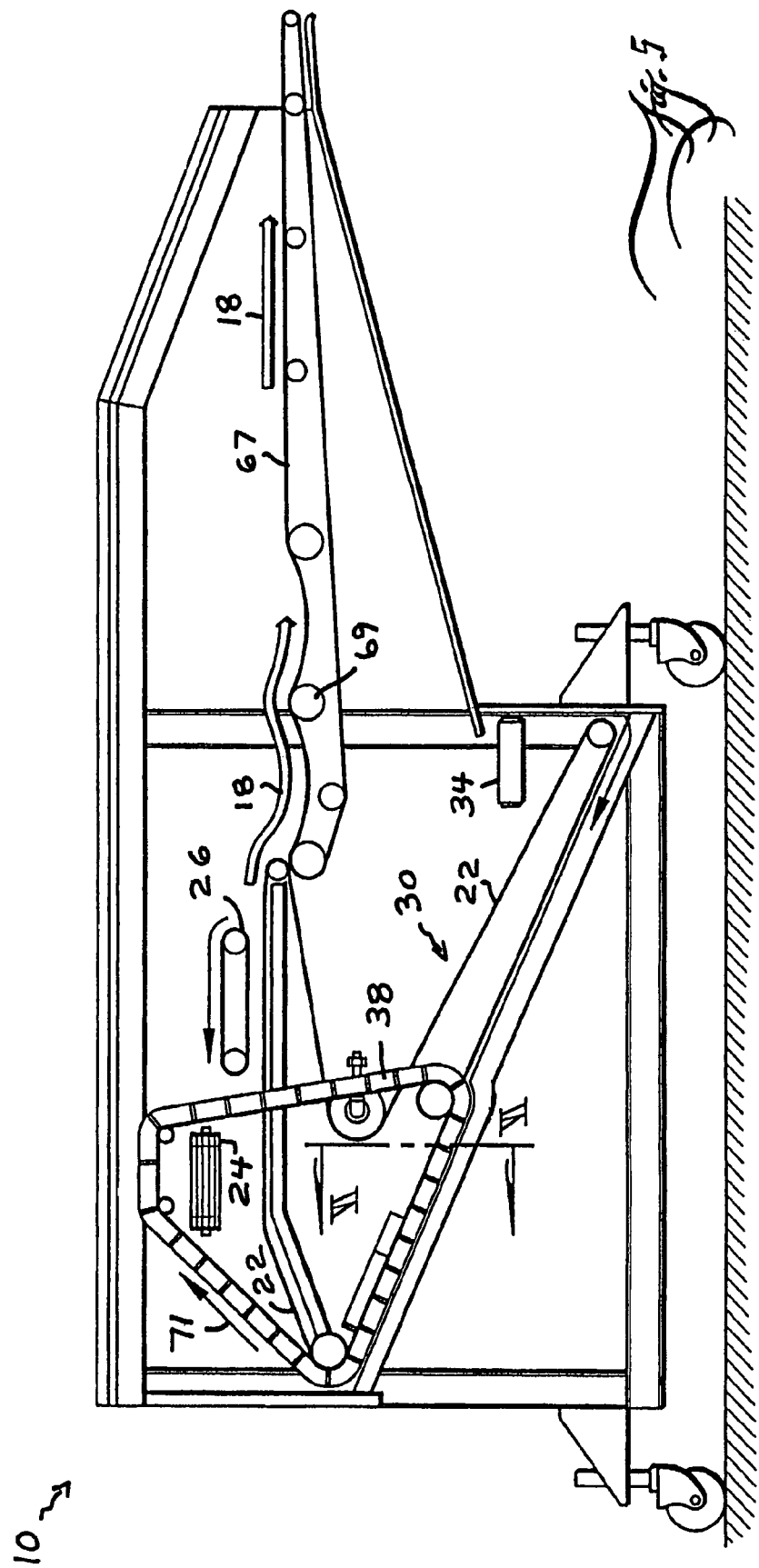

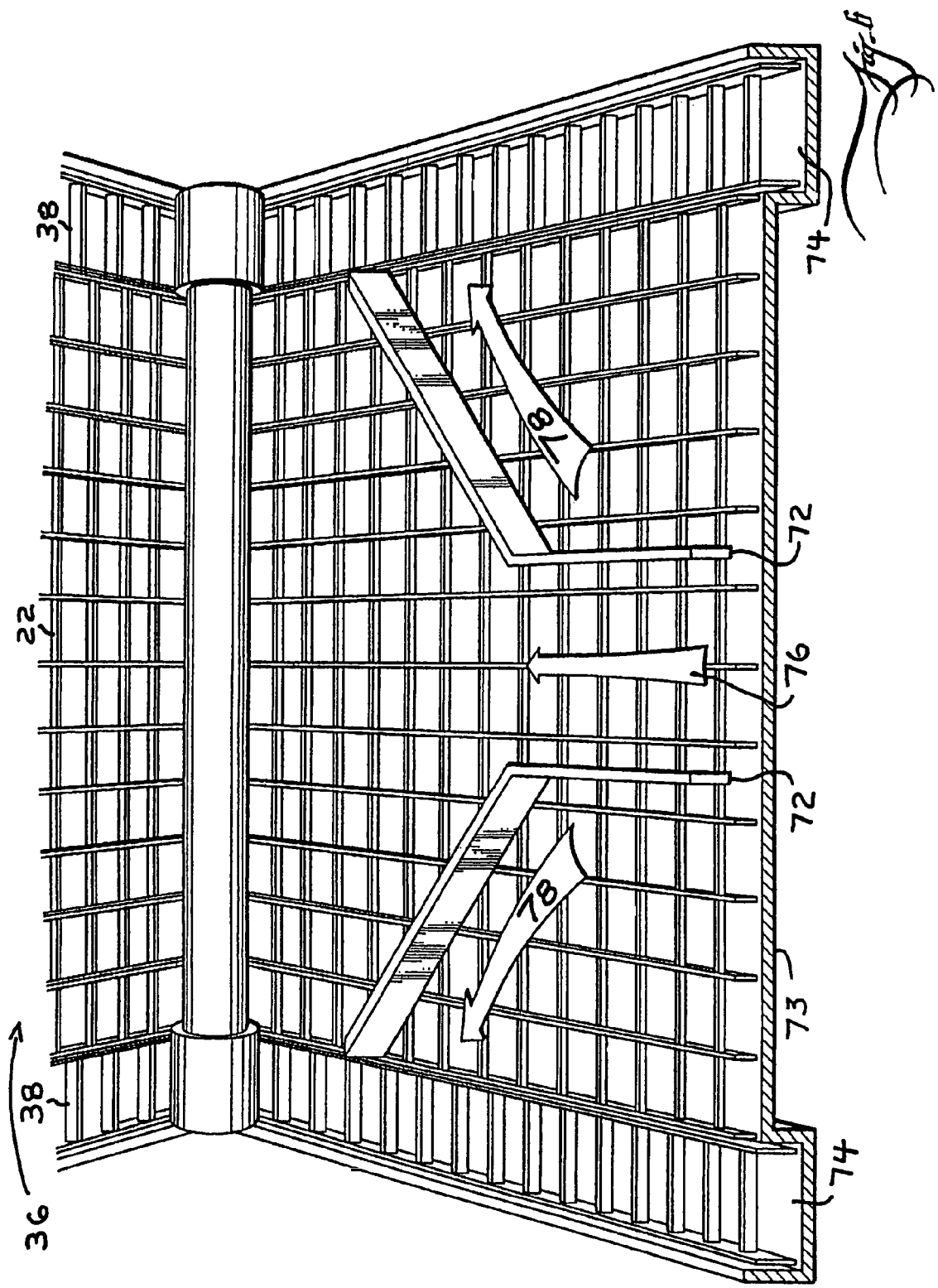

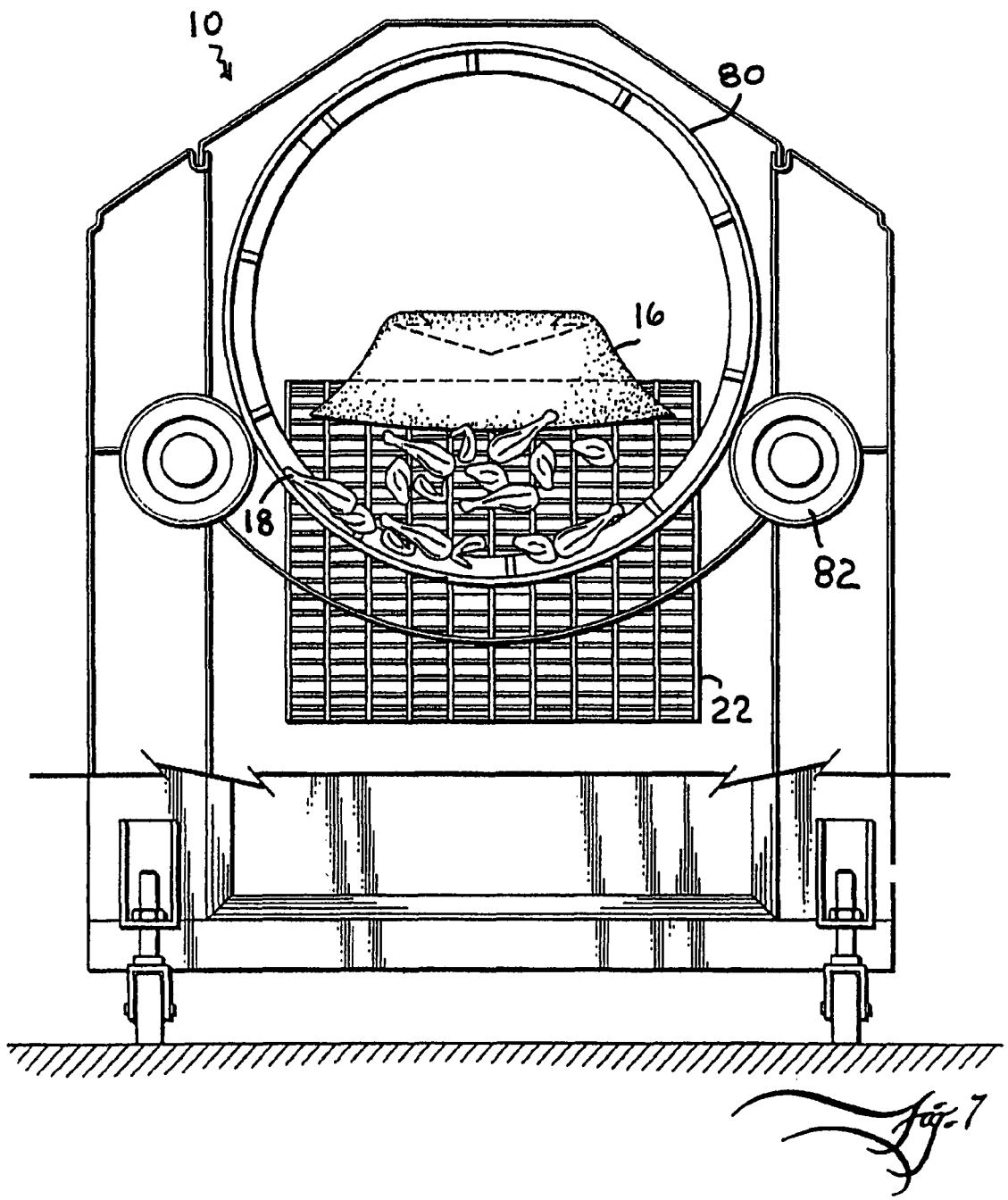

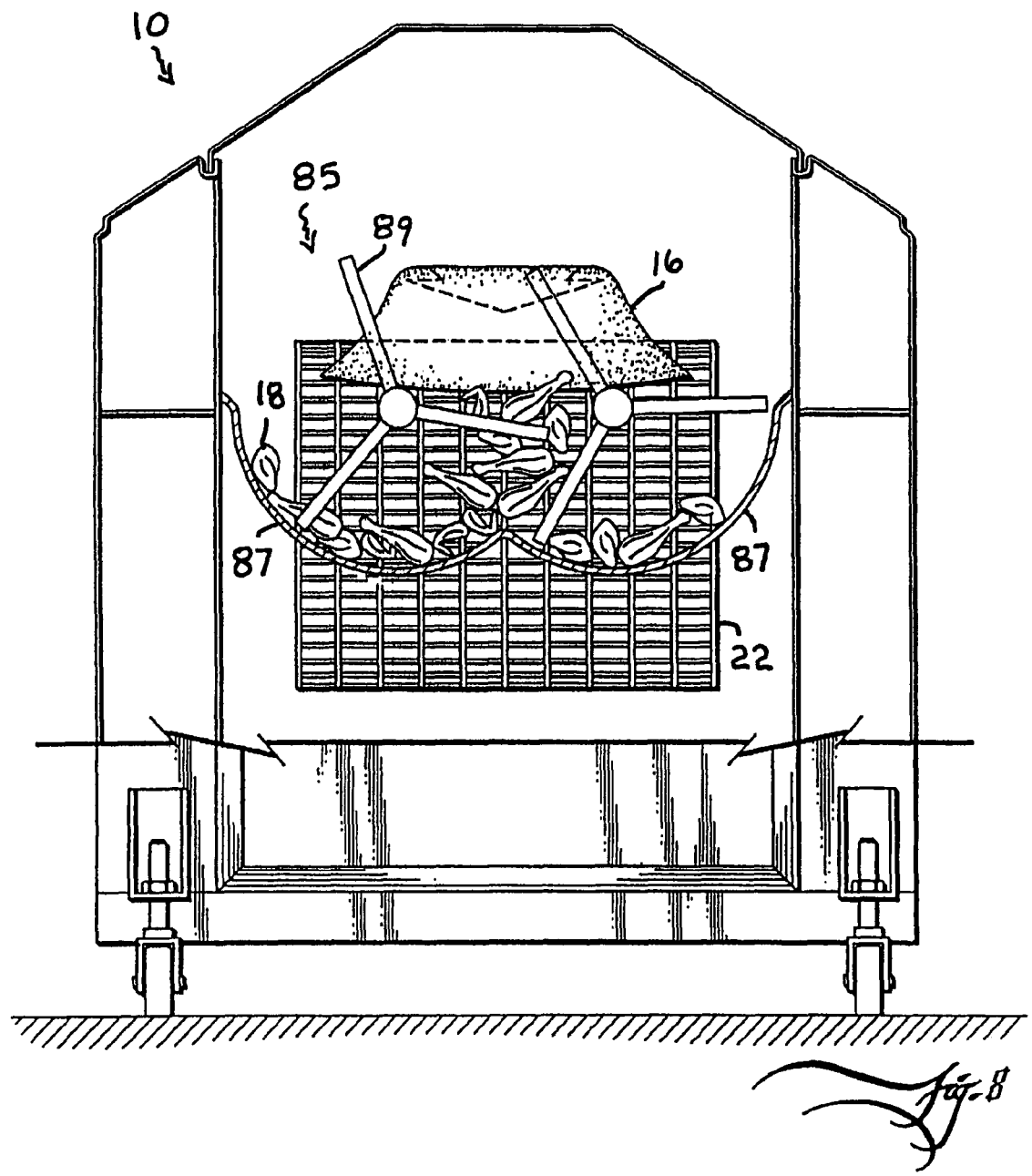

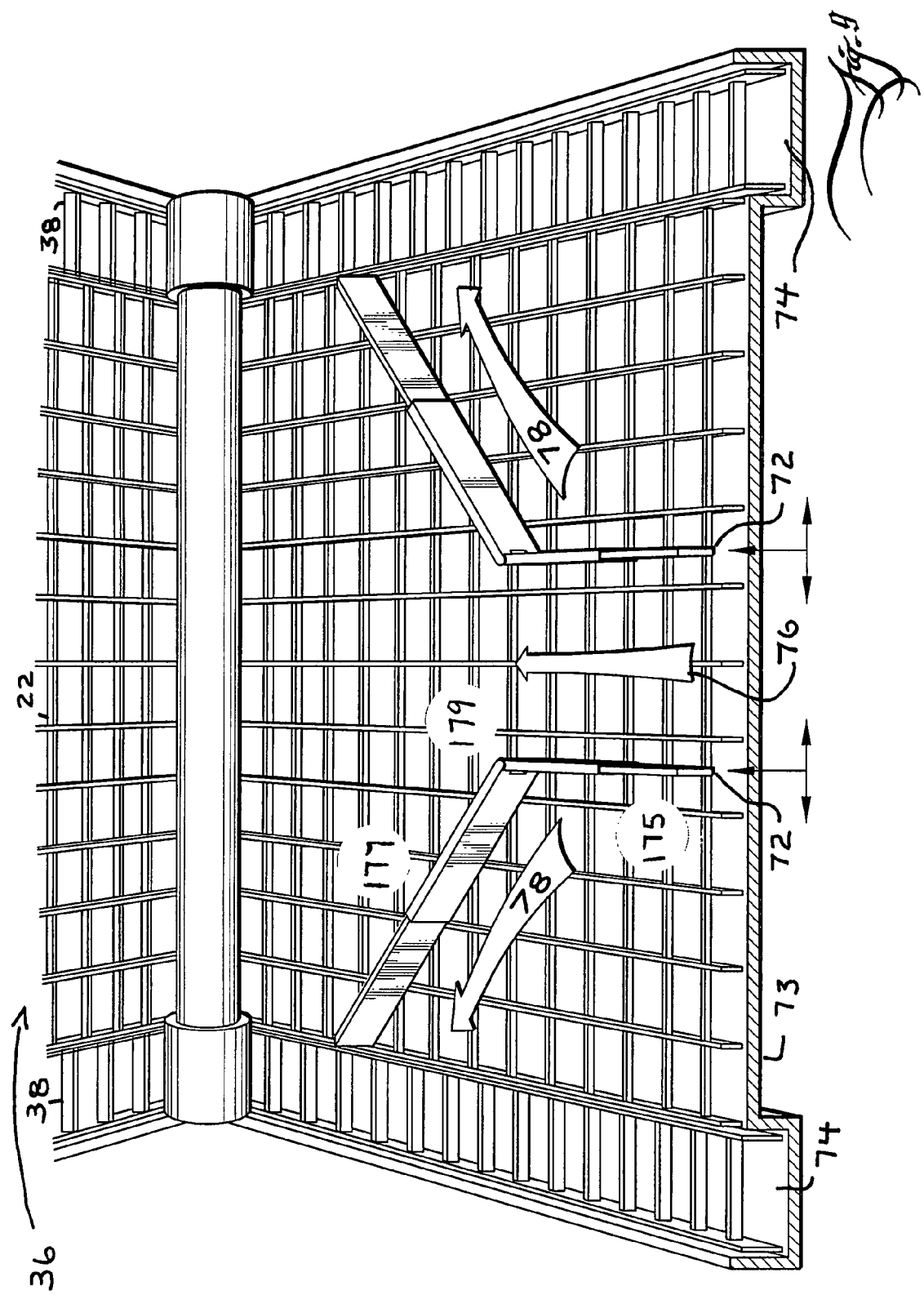

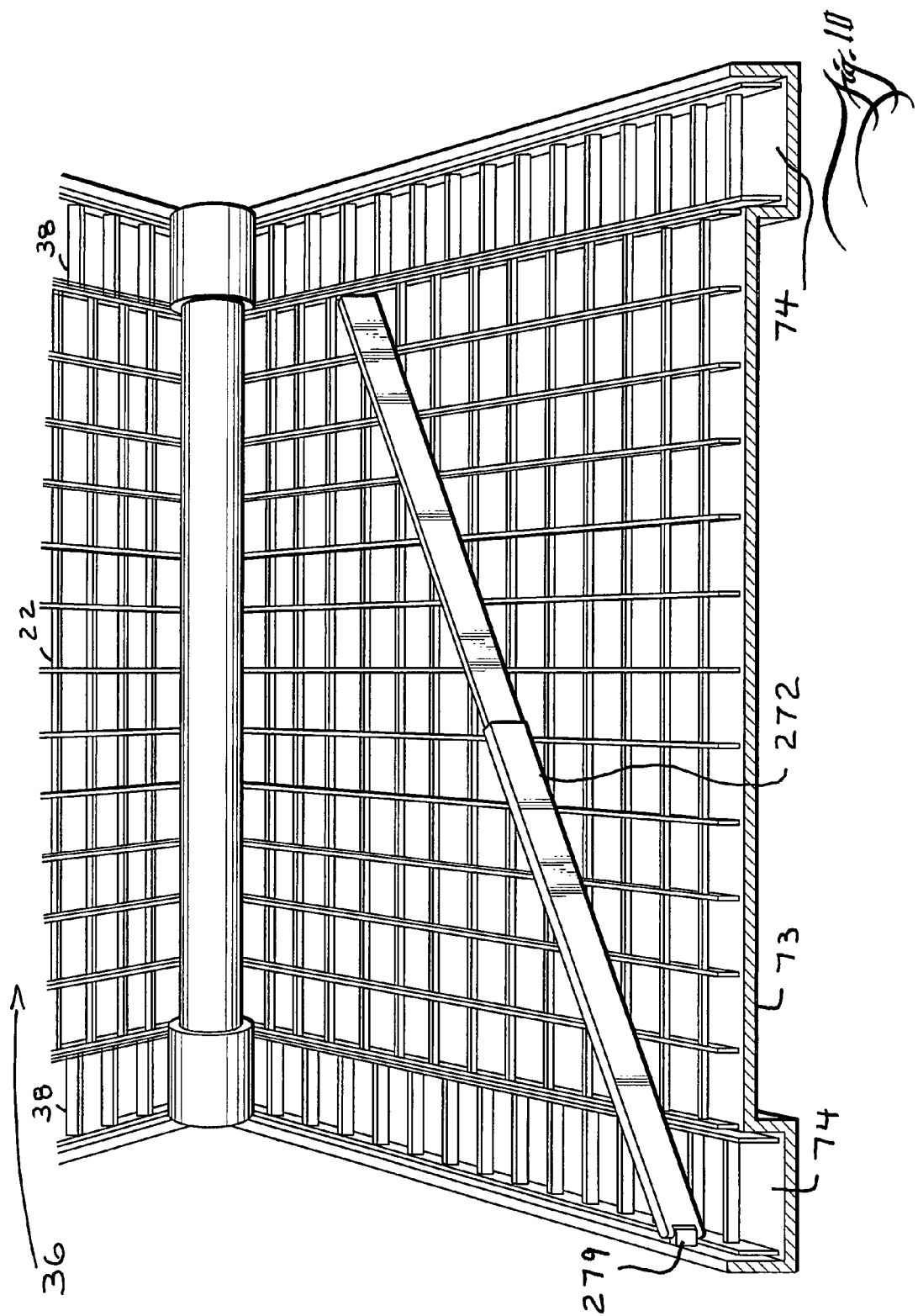

GUTTERS AND PLOWS FOR COATING-MATERIAL RECIRCULATION IN FOOD-COATING APPARATUS

CROSS-REFERENCE TO RELATED APPLICATION(S)

This application is a continuation-in-part of U.S. patent application Ser. No. 10/853,579, filed May 24, 2004, now U.S. Pat. No. 7,231,885 which claims the benefit of U.S. Provisional Application No. 60/488,777, filed Jul. 21, 2003, and U.S. Provisional Application No. 60/473,066, filed May 23, 2003, the disclosures of all which are incorporated herein by this reference.

BACKGROUND AND SUMMARY OF THE INVENTION

The invention relates to a coating apparatus for applying a coating to a stream of product passing continuously through it, and more particularly to a coating apparatus that handles food products fit for human consumption including without limitation chicken, fish, seafood, pork, beef and so on. The coating material is commonly a breading material which might range in composition from a flour mixture to a coarse bread-crumb mixture. The various kinds of breading material allow inclusion of spices or flavorings within the mixture.

The coating apparatus has an intake system which is where the main coating activity. Additionally, the coating apparatus has belts in substitution of functions normally provided by a rotating drum—see, eg., U.S. Pat. Nos. 5,937,744 and/or 6,158,332—a substitute belt system, it being more conveniently referred to herein as a "flexible drum." The flexible drum tumbles the coated product to knock off excess breading material as well as to ensure more even application of the coating material. The food product can be routed at the option of the operator(s) of the coating apparatus to bypass the drum. Bypassing the drum is desirable when processing "formed" food products such as beef patties or fish cakes and the like, which would disintegrate in the drum.

Further inventive aspects of this coating apparatus include improvements in the way that the flexible drum discharges coated product onto an outflow conveyor in order that the outflowing product be automatically spread more evenly distributed across the width of the outflow conveyor.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a side elevational view of, partly in section through a vertical axis of symmetry therefor, a coating apparatus in accordance with the invention which incorporates a flexible drum accessory in accordance with the invention;

FIG. 2 is a discharge-end end elevational view of FIG. 1 (ie., as taken in the direction of viewing the discharge end), in which portions are broken away including removal of the outflow conveyor from the view;

FIG. 3 is a side elevational view that is partly in section and comparable to FIG. 1, except showing an "in-line triple flip" accessory in accordance with the invention, for exchangeable substitution with the flexible drum accessory of FIG. 1;

FIG. 4 is a perspective view of a "flexible drum triple flip" accessory in accordance with the invention, for exchangeable substitution in the coating apparatus with either the flexible drum accessory of FIG. 1 or the in-line triple flip accessory of FIG. 3;

FIG. 5 is a side elevational view that is partly in section and comparable to FIG. 1, except showing conversion of the coating apparatus for linear running of the product therethrough;

FIG. 6 is a perspective view of the vertex of the three astride infeed conveyors, and taken in the direction of arrows VI-VI in FIG. 5;

FIG. 7 is a discharge-end end elevational view comparable to FIG. 2 except showing a hard-drum accessory in accordance with the invention, for exchangeable substitution in the coating apparatus with either the flexible drum accessory of FIG. 1, the in-line triple flip accessory of FIG. 3, or the flexible drum triple flip accessory of FIG. 4;

FIG. 8 is a discharge-end end elevational view comparable to FIG. 7 except showing a "made by hand" accessory in accordance with the invention, for exchangeable substitution in the coating apparatus with either the flexible drum accessory of FIG. 1, the in-line triple flip accessory of FIG. 3, the flexible drum triple flip accessory of FIG. 4, or the hard-drum accessory of FIG. 7;

FIG. 9 is a perspective view comparable to FIG. 6 except showing an alternate embodiment of plows, wherein one or both of the plows comprises telescopic legs and telescopic arms hinged together for multiple adjustability; and FIG. 10 is a perspective view comparable to FIGS. 6 and 9 except showing a further embodiment in arrangement of plows, wherein this arrangement comprises a single slanted plow which is hinged at its base end and is otherwise telescopic.

DETAILED DESCRIPTION OF THE PREFERRED EMBODIMENTS

FIG. 1 shows a coating apparatus 10 in accordance with the invention incorporating a flexible drum accessory 20 in accordance with the invention (a dust cover 12 is shown in an elevated position). Food product 14 is introduced on the upper carrying run of an intake conveyor 22, which transits the product 14 underneath a "shower curtain" of breading material 16 rained down from above by a sprinkling (or sifting) conveyor 24. Preferred conveyor constructions include what are known as a drag-link construction and as shown by, for example, the FIG. 4 of U.S. Pat. No. 5,937,744—Nothum et al., or else an open wire mesh construction and as shown by, for example, the FIG. 6 of U.S. Pat. No. 6,305,274 (B1) Nothum et al. FIG. 2 hereof presents an illustrative depiction of such a "shower curtain" of coating material 16. Returning to where FIG. 1 hereof shows the product 18 progressing past the station of the sprinkling conveyor 24, the food product 18 is further advanced on the intake conveyor 22 to be squeezed beneath a low gap defined by an overhead conveyor-belt compressor 26. It is an aspect of the invention that the inventive overhead conveyor-belt compressor 26 replaces and solves the shortcomings associated with what the prior art has relied on to date, namely, an overhead compression roller. A shortcoming with overhead compression rollers is that they apply compression only in the form of a cylindrical surface, and not as according to the invention by a conveyor-belt compressor 26 which can be arranged to provide a defined gap height over an indefinite length of longitudinal (eg., the direction between upline and downline) extent.

The conveyor-belt compressor 26 is especially advantageous for pressing in the breading material and/or providing an additional squeeze for shape to flat product such as patties or nuggets (eg., chicken nuggets) and the like.

Not only does FIG. 1 provide a sectional side view of the flexible drum accessory 20, to be described more particularly below, but it also shows an outflow conveyor 28 for discharging the coated food product 18 to succeeding downline processes (eg., an "in-line triple flip" accessory indicated by reference numeral 50 in FIG. 3), and an excess-breading material recirculation system 30, as well as a flexible belt product-spreading system in accordance with the invention, to be described more particularly below (ie., indicated by reference numeral 60 in FIG. 4).

Briefly, product 18 discharged from the flexible drum 20 pours onto the product-(eg., upper) run of the inclined outflow conveyor 28, which optionally might have a drag-link construction. The outflow conveyor 28's return (eg., lower) run scrapes on top of a tray or pan 32. Excess breading material poured out of the flexible drum 20 sifts through the outflow conveyor 28's upper (eg., product-carrying) and lower (eg., return) runs, to alight upon the tray or pan 32. If the outflow conveyor 28 has a drag-link construction, the drag flights of the return run scrape across the tray or pan 32 and motivate the excess coating material to a drop zone, directly above a filtering conveyor 34. The filtering conveyor 34 preferably has a comparable drag-link construction and is preferably undergirded by a screen (not shown) scaled for passing fines but transiting coarse material, which is ejected overboard out one side or the other of the coating apparatus 10. The filtering conveyor 34 is arranged to run laterally, in a loop to the left and right direction, or in other words, transverse to the product-flow direction of upline to downline.

What excess breading material that manages to filter through the filtering conveyor system 34 winds up pouring down onto the pick-up zone of the recirculation system 30. The recirculation system 30 comprises a set of three astride conveyors or, that is, in consideration first of a central one of these three is an intake conveyor 22. Flanking this intake conveyor 22's left and right sides are breading elevators (not shown in FIG. 1 but indicated as 38 in FIGS. 5 and 6).

FIGS. 1 and 2 together better show the inventive flexible drum breader 20 in accordance with the invention. The flexible drum 20 more accurately comprises a belt 40, for example a wire mesh belt, slung to provide a U-shaped product-carrying run (more accurately that is, if unsupported, a catenary-shaped product carrying run). The belt 40 of said flexible drum 20 preferably includes flighting 42 to progressively advance material 18 poured into the upline end to its downline (or discharge end), from which the tumbled coated product 18 is discharged upon the outflow conveyor 28 as shown by FIG. 1.

Various inventive aspects of this configuration include affording the functionality of a hard drum except, instead of being a complete cylinder, the flexible drum 20 has an open top half. For considerations of wash down, this affords considerable advantages, including less prerequisite disassembly of parts for wash down (and then consequent reassembly for productive, cost justifying run time).

FIG. 2 is an end elevational view of FIG. 1. More particularly, FIG. 2 provides an end-on view of the discharge end, except the outflow conveyor 28 and other intervening portions obstructing the view of the flexible drum 20 are removed for clarity's sake. The flexible drum 20 provides a radially rotating product-carrying surface equipped with longitudinally-motivating flights 44 so that product 18 is comparably tumbled rotationally as well as longitudinally motivated as a hard drum, an example of a hard drum implementation of drum breading include at least the above-referenced eg., U.S. Pat. Nos. 5,937,744 and/or 6,158,332 of Nothum et al.

FIGS. 1 and 2 further show a counter-rotating spreading system 44 which is both counterpart to the spreading paddles shown also by the above-referenced eg., U.S. Pat. Nos. 5,937,744 and/or 6,158,332 of Nothum et al., except implemented by a soft design or, that is, implemented by more particularly a counter-rotating spreading belt. FIGS. 1 and 2 show that both the counter-rotating soft spreading system 44 is aligned coaxial with the flexible drum 20 as well as is spaced to operate in a coaxial gap above the main product-carrying run thereof. The counter-rotating spreading system 44's belt is arranged to act on merely a fractional portion of the downline end of the flexible drum 20. The counter-rotating spreading system 44's belt is provided with just a few (three in the drawings) flights 46 which are spaced angularly about 120° apart in the lower U-shaped portion.

Both the main flexible drum 20 as well as the counter-rotating spreading system 44's belt have respective return runs 47 and 49. FIG. 2 shows alternative ways of routing the return runs 47 and 49 of such flexible belt operatives. For the main flexible-drum belt, the return run 47 thereof loops underneath the product-carrying run in a generally-parallel U-shaped loop. That is one illustrative way of routing a return run for a soft operative in accordance with the invention. Alternatively, as shown for the counter-rotating spreading system 44, the return run 49 is routed horizontally over the end rollers therefor. FIG. 2 depicts product 18, such as and without limitation drumsticks, being poured onto the upline portions of the flexible drum 20 from the discharge end of the intake conveyor 22, and thereafter being tumbled in longitudinal transit thereacross, ultimately to be counter-rotationally acted upon by the overhead soft spreading system 44. The advantage of the desirability of a spreading system 44 is more particularly described in connection with FIGS. 10*a* and 10*b* as well as FIG. 4 of U.S. Pat. No. 5,937,744—Nothum et al. (including the accompanying written disclosure therefor). The present inventive implementation of the same strategy in a soft belt design is only disclosed and proceeded upon in accordance with the present inventive implementation.

FIG. 3 is comparable to FIG. 1 except it shows an "in-line triple flip" accessory 50 in accordance with the invention, for exchangeable substitution with the flexible drum accessory 20 of FIG. 1. Product is "flipped" over every successive drop from the intake conveyor 22's discharge onto an upper outflow conveyor 52, and then successively onto an middle outflow conveyor 54, and so on, onto ultimately (in this exemplary illustration) and a final outflow conveyor 56.

FIG. 4 shows a soft rendition of the foregoing, implemented by a "flexible drum triple flip" accessory 60 in accordance with the invention. It affords exchangeable substitution in the coating apparatus 10 with either the flexible drum accessory 20 of FIG. 1 or the in-line triple flip accessory 50 of FIG. 3. Notably, each successive U-belted outflow conveyer 64 or 66 in FIG. 4 is of a progressively larger diameter than the preceding implementation 62 or 64 thereof.

FIG. 5 shows several things. One, it shows conversion 67 of the coating apparatus 10 of FIG. 1 for linear running of the product therethrough. In this respect, FIG. 5 additionally shows a thumping eccentric roller 69 for inducing the shaking or knocking off of excess breading material, so that such ultimately drops off and down into the recirculation system 30 of the invention. The predominant purpose for the linear-running conversion 67 is for handling delicate product which ought not to be neither tumbled nor flipped.

Additionally, FIG. 5 shows aspects of the invention pertaining to the elevator system 38 which circulates/recirculates coating material 16 from the recirculation system 30 ultimately for feeding the sprinkling (or sifting) conveyor 24. As better shown by FIG. 6, the elevator system 38 comprises a pair of flanking elevator conveyors 38 which, although substantially thinner in lateral width than the central main intake conveyor 22, are appointed with the duty of elevating the predominant heft of the sprinkling downpour of the coating material 16 by the sprinkling (or sifting) conveyor 24.

As mentioned above, it is an aspect of the invention to non-exclusively prefer conveyor constructions that are known as a drag-link construction and as shown by, for example, the FIG. 4 of U.S. Pat. No. 5,937,744—Nothum et al., and as shown as well in FIGS. 6, 9 and 10 hereof. Alternatively suitable other conveyor constructions include without limitation open wire mesh construction such as shown by, for example, the FIG. 6 of U.S. Pat. No. 6,305,274 (B1) Nothum et al.

The vantage point of the views of FIG. 6 or 9-10 hereof as can be reckoned as the view taken in the direction of arrows VI-VI in FIG. 5. As shown by FIG. 6 or 9-10, the laterally-wider main intake conveyor 22 is flanked by the laterally-thinner elevator conveyors 38 and 38. Referencing FIG. 5 briefly, it shows the circuit coursed by the elevator conveyors 38 is the circuit indicated by the reference arrow 71 therein (ie., in FIG. 5.)

FIG. 6 more particularly shows that the overhead space of the up-return run of the main intake conveyor 22 is partitioned, in its lower stretches, by flaring plows 72 (eg., fences). These plows 72 push breading material (eg., indicated by reference numeral 16 in FIG. 2) laterally around in the overhead space towards the lateral elevators 38. The main intake conveyor 22 scrapes across an up-sloping bottom panel 73 for the up-return run thereof, which affords the possibility for the open-drag link construction of conveyor 22 to motivate (slide) excess breading material up the up-slope of the bottom panel 73.

To accommodate the responsibility for a carrying-capacity heavier than in proportion to their lateral width (and relative the light-load responsibility of the main intake conveyor 22), it is an aspect of the invention that the elevator conveyors 38 operate within gutters 74. The gutters 74 give each of the opposite elevator conveyors 38 an increased carrying capacity over the main central intake conveyor 22 by virtue of the depth of the gutters 74 (and relative the plane of conveyor 22's bottom scrape panel 73). All that is wanted from the main central intake conveyor 22 is a relatively light-load comprising a full bed 76 of coating material for introduced-product 14 on the intake end to ride upon. Experience suggests, however, it is more desirable for substantial streams 78 of the circulated/recirculated breading material to be shunted aside to the flanking elevators 38, because much more of it is required by the sprinkling (or sifting) conveyor 24 than is needed to make a bed of such with the main intake conveyor 22. Therefore, in order to obtain the desired distribution of relative breading-material mass-flow up the respective conveyor sections 22 as well as 38 and 38, it is an aspect of the invention to deepen the troughs of the laterally-flanking elevators 38 with by the gutters 74 and 74 astride the central conveyor 22's bottom panel 73, and as shown by FIG. 6.

In general, the carrying capacity of any one of the laterally-flanking elevators 38 or 38 or the main intake conveyor 22 is proportionate to the cross-sectional area of each (eg., the product of width times depth of the subject conveyor). The main central intake conveyor 22 is broader but shallower, in contrast to the laterally-flanking elevator conveyors 38 and 38 which are thinner but deeper.

Ordinarily skilled designers would routinely appreciate given the foregoing inventive insights into the invention that the relative carrying capacity among the conveyor 22 and elevators 38 and 38 can be varied by changing constructional factors such as, in order of preference, the depth of the elevators 38 and 38, the shallowness of the main central intake conveyor 22, the width of the elevators 38 and 38, and then the width of the main central intake conveyor 22. It should be appreciated that there is no requirement for symmetry between elevators 38 and 38. In consequence, elevators 38 and 38 have been shown symmetric to each other in the drawings for convenience's sake only in this disclosure.

FIG. 9 is comparable to FIG. 6 and showing an intake conveyor 22 carrying a central stream of coating material 76. The conveyor 22 is flanked by left and right coating elevators 38 coursing through gutters 74 and receiving diverted streams 78 of coating material by way of plows 172. Unlike FIG. 6, plows 172 represent an alternate embodiment of the invention and comprise telescopic legs 175 and telescopic arms coupled together by a stiff hinge 179 and hinged together for multiple adjustability. Whereas the breadth and depth of the conveyor 22 or elevators 38 and 38 are built-in to the design of the apparatus 10 at the time of construction, during the use-life of said apparatus 10 and between successive uses thereof the diversion of the central re-circulation stream 76 into diverted streams 78 can be adjusted at will by the adjustability of adjustable plows 172.

FIG. 10 is comparable to FIGS. 6 and 9 except showing a further embodiment of a plow 272 in accordance with the invention, comprising the single slanted plow 272 which is coupled to a pivot 279 at its base end and is otherwise telescopic. Preferably the structure to which the pivot 279 is mounted is either laterally-movable left and right in the overhead space above the central conveyor 22 and flanking elevators 38 and 38 or else is mountable at discretely different positions in the left-to-right direction. Whereas the foregoing is not shown in FIG. 10, it is indicated by adjustable direction arrows in connection with the bases of plows 172 in FIG. 9.

By way of background, some coating recirculation systems (eg., 30) dump all the coating on one side of the conveyor 22. Hence the adjustability of plows 172 or plow 272 in accordance with the invention affords users opportunity to tune the performance of the plow 272 in performing its work of diverting a central re-circulation stream (eg., 76) into one or more diversion streams (eg., 78).

FIG. 7 is an end elevational view of the discharge end of the coating apparatus 10 in accordance with the invention, and comparable to FIG. 2, except showing a hard-drum accessory 80 in accordance with the invention, which is provided for exchangeable substitution in the coating apparatus 10 with either the flexible drum accessory 20 of FIG. 1, or the in-line triple flip accessory 50 of FIG. 3, or else the flexible drum triple flip accessory 60 of FIG. 4. This hard-drum accessory 80 is show driven by rubber tires 82 engaging its outside wall as shown.

FIG. 8 is an end elevational view of the discharge end of the coating apparatus 10 in accordance with the invention, and comparable to FIG. 2 or 7, except showing a "made by hand" accessory 85 in accordance with the invention, for exchangeable substitution in the coating apparatus 10 with either the flexible drum accessory 20 of FIG. 1, or the in-line triple flip 50 accessory of FIG. 3, or else the flexible drum triple flip 60 accessory of FIG. 4, or otherwise the hard-drum accessory 80 of FIG. 7, and so on, there being an indefinite number of other accessories to substitute therein. In FIG. 8, the pan or tray of the accessory is shaped in ω-shaped contour (eg., not just determinable as an "omega" shape or double u-shape but perhaps alternatively as having dual, rounded troughs 87). Other inventive aspects of the FIG. 8 embodiment include the paddles 89 depicted therein which, in combination the double u-shaped troughs 87, promote product flipping/tumbling according to a different stroke for a fine differentiation in end-product results in order to obtain a classic result formerly most easily obtained by manual processes (eg., "made by hand") in an inventive way by said coating apparatus 10 in accordance with the invention.

The above-referenced U.S. Pat. Nos. 5,937,744 and/or 6,158,332—Nothum et al. are incorporated by reference.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. Food-product coating apparatus for a food-product line; said apparatus comprising:
    an inflow conveyor extending from an intake end to a discharge end;
    a food-product tumbling or flipping device extending from an intake end to a discharge end;
    an outflow conveyor extending from an intake end to a discharge end; and
    a re-circulation system for re-circulating excess coating material recovered at the outflow conveyor back to the inflow conveyor;
    wherein said inflow conveyor is adapted to receive an inflow of a food-product stream from an up-line process in the food-product line as well as an inflow of re-circulated excess coating material from said re-circulation system and input both said streams into the intake end of the food-product tumbling or flipping device;
    said food-product tumbling or flipping device adapted to tumble or flip food-product and coating material between the intake and discharge ends thereof, and further adapted to discharge food-product covered in coating as well as excess coating material onto the outflow conveyor;
    said outflow conveyor adapted to discharge food-product covered in coating across the discharge end thereof, and is further adapted to discharge excess coating material to the re-circulation system;
    said recirculation system comprising at least first and second return conveyors which have respective coating-material motivating runs, and further comprising a first bottom wall for the motivating run of the first return conveyor to scrape over and thereby motivate a first stream of return coating material as well as a second bottom wall for the motivating run of the second return conveyor to scrape over and thereby motivate a second stream of return coating material;
    both the first and second return conveyors having two factors comprising respectively a first lateral width and first depth measure for the first return conveyor as well as a second lateral width and second depth measure for the second return conveyor wherein the factors are selected such that if the first and second return conveyors are driven at the same speed there are first and second material-flow rate capacities respectively for the first and second streams of return coating material whereby the first and second streams can be distributed to different end purposes; and
    wherein the first and second depth measures are different.

2. The food-product coating apparatus of claim 1 wherein the at least first and second return conveyors have an open-cell drag conveyor construction which if un-supported by an underlying wall would allow the return coating material to sift through.

3. The food-product coating apparatus of claim 1 wherein the first and second lateral widths are different.

4. The food-product coating apparatus of claim 3 the second lateral width is substantially narrower than the first lateral width while in contrast the first depth measure is shallower than the second depth measure such that the substantially narrower second return conveyor has an enhanced coating material flowrate capacity in comparison to the shallower first return conveyor even if driven at the same speed.

5. Food-product coating apparatus for a food-product line; said apparatus comprising:
    an inflow conveyor extending from an intake end to a discharge end;
    a food-product tumbling or flipping device extending from an intake end to a discharge end;
    an outflow conveyor extending from an intake end to a discharge end; and
    a re-circulation system for re-circulating excess coating material recovered at the outflow conveyor back to the inflow conveyor;
    wherein said inflow conveyor is adapted to receive an inflow of a food-product stream from an up-line process in the food-product line as well as an inflow of re-circulated excess coating material from said re-circulation system and input both said streams into the intake end of the food-product tumbling or flipping device;
    said food-product tumbling or flipping device adapted to tumble or flip food-product and coating material between the intake and discharge ends thereof, and further adapted to discharge food-product covered in coating as well as excess coating material onto the outflow conveyor;
    said outflow conveyor adapted to discharge food-product covered in coating across the discharge end thereof, and is further adapted to discharge excess coating material to the re-circulation system;
    said recirculation system comprising an endless product-carrying conveyor and an endless elevator conveyor driven at the same speed;
    said product-carrying conveyor having a product-carrying run and a return run which includes in part an up-sloping grade;
    said elevator conveyor having a return run and an elevating run which includes in part a corresponding up-sloping grade wherein said product-carrying and elevator conveyors are arranged side-by-side along said up-sloping grades therefor and generally flush with each other along a common plane of the grade;
    an up-sloping bottom panel for supporting the product-carrying conveyor along the up-sloping grade therefor and enabling the product-carrying conveyor to motivate a first stream of coating material;
    an up-sloping gutter flanking the bottom panel along one lateral edge thereof for supporting the elevator conveyor along the up-sloping grade therefor and enabling the elevator conveyor to motivate a second stream of coating material;

wherein the product-carrying conveyor is shallower relative the relatively deeper elevator conveyor such that the elevator conveyor has a relatively greater coating-material motivating capacity than the product-carrying conveyor per unit width given coating material smoothed across both conveyors in the common plane of the grade.

6. The food-product coating apparatus of claim 5 further comprising another an up-sloping gutter flanking the bottom panel along the other lateral edge thereof and another elevator conveyor having a return run and an elevating run which includes in part an up-sloping grade wherein said product-carrying is laterally flanked by said one and another elevator conveyors along said up-sloping grades therefor and each generally flush along the common plane of the grade, and wherein said other up-sloping gutter provides support for said other elevator conveyor along the up-sloping grade therefor and enabling said other elevator conveyor to motivate a third stream of coating material.

7. The food-product coating apparatus of claim 5 wherein said product-carrying conveyor is relatively broad between lateral edges thereof relative to said elevator conveyor which is relatively narrow between lateral edges thereof.

8. The food-product coating apparatus of claim 5 wherein said product-carrying conveyor is relatively broad between lateral edges thereof as well as relatively shallow relative to said elevator conveyor which is relatively narrow between lateral edges thereof as well as relatively deep.

9. The food-product coating apparatus of claim 6 wherein said product-conveyor's first stream comprises breading material destined to become a bottom bed of breading material for conveyance of food product thereon in contrast to the elevator conveyor's second stream, which is destined to become a top-coating of breading material.

10. The food-product coating apparatus of claim 5 further comprising at least one plow, wherein the product-carrying conveyor and elevator conveyor define a common headspace above the common plane of the grade, said plow presenting a lower wiping edge gapped slightly above the common plane of the grade for smoothing out overly-piled heaps of coating material.

11. The food-product coating apparatus of claim 10 wherein said plow's lower wiping edge extends between a base end at a lower elevation and a terminus at a higher elevation and includes a slanting portion at least in part to divert overly-piled heaps of coating material laterally one way or another.

12. The food-product coating apparatus of claim 11 further comprising fixing the plow's base end to said apparatus at adjustable lateral locations to the left or right.

13. The food-product coating apparatus of claim 11 further comprising fixing the plow's base end to said apparatus by an adjustable, pivot connection to change the wiping edge's slant angle.

14. The food-product coating apparatus of claim 13 wherein said plow comprises an assembly of telescoped members to allow the adjustable lengthening or foreshortening of the extent of the wiping edge.

15. The food-product coating apparatus of claim 13 wherein said plow comprises an intermediate hinge connection to allow the adjustment of a crook therein intermediate the terminus and base end thereof.

16. Food-product coating apparatus for a food-product line; said apparatus comprising:

an inflow conveyor extending from an intake end to a discharge end;
a food-product tumbling or flipping device extending from an intake end to a discharge end;
an outflow conveyor extending from an intake end to a discharge end; and
a re-circulation system for re-circulating excess coating material recovered at the outflow conveyor back to the inflow conveyor;
wherein said inflow conveyor is adapted to receive an inflow of a food-product stream from an up-line process in the food-product line as well as an inflow of re-circulated excess coating material from said re-circulation system and input both said streams into the intake end of the food-product tumbling or flipping device;
said food-product tumbling or flipping device adapted to tumble or flip food-product and coating material between the intake and discharge ends thereof, and further adapted to discharge food-product covered in coating as well as excess coating material onto the outflow conveyor;
said outflow conveyor adapted to discharge food-product covered in coating across the discharge end thereof, and is further adapted to discharge excess coating material to the re-circulation system;
said recirculation system comprising at least one endless conveyor which has a first run and a second run,
at least one of the first and second runs comprises a return run, and
at least one of the first and second runs comprises in part an up-sloping grade;
said recirculation system moreover comprising an up-sloping bottom panel for supporting said conveyor along the up-sloping grade therefor and enabling said conveyor to motivate a stream of coating material; and
said recirculation system further comprising at least one plow, wherein said conveyor defines a headspace above the plane of the grade, said plow presenting a lower wiping edge gapped slightly above the plane of the grade for smoothing out overly-piled heaps of coating material;
wherein said plow's lower wiping edge extends between a base end at a lower elevation and a terminus at a higher elevation and includes a slanting portion at least in part to divert overly-piled heaps of coating material laterally one way or another.

17. The food-product coating apparatus of claim 16 further comprising fixing the plow's base end to said apparatus at adjustable lateral locations to the left or right.

18. The food-product coating apparatus of claim 16 further comprising fixing the plow's base end to said apparatus by an adjustable pivot connection to change the wiping edge's slant angle.

19. The food-product coating apparatus of claim 16 wherein said plow comprises an assembly of telescoped members to allow the adjustable lengthening or foreshortening of the extent of the wiping edge.

20. The food-product coating apparatus of claim 16 wherein said plow comprises an intermediate hinge connection to allow the adjustment of a crook therein intermediate the terminus and base end thereof.

* * * * *